(12) United States Patent
McCarthy et al.

(10) Patent No.: US 8,478,305 B2
(45) Date of Patent: Jul. 2, 2013

(54) SYSTEM AND METHOD FOR INTEGRATING LOCATION INFORMATION INTO AN INTERNET PHONE SYSTEM

(75) Inventors: Timothy Dennis McCarthy, Arlington Heights, IL (US); Daniel A. Cookro, Litchfield Park, AZ (US); Parham Shabaniani, Gilbert, AZ (US)

(73) Assignee: CSR Technology Inc., San Jose, CA (US)

( * ) Notice: Subject to any disclaimer, the term of this patent is extended or adjusted under 35 U.S.C. 154(b) by 1082 days.

(21) Appl. No.: 12/100,331

(22) Filed: Apr. 9, 2008

(65) Prior Publication Data

US 2009/0258655 A1 Oct. 15, 2009

(51) Int. Cl.
*H04W 24/00* (2009.01)

(52) U.S. Cl.
USPC ............ 455/456.6; 455/404.2; 455/456.1; 455/456.5; 370/352; 370/353; 370/354; 370/355; 370/356

(58) Field of Classification Search
USPC .. 455/402.2, 404.2, 456.1–457, 414.1–414.4, 455/426.2, 73, 550.1, 556.1, 556.2, 557; 340/539.13, 988–996; 370/493–495, 352–356
See application file for complete search history.

(56) References Cited

U.S. PATENT DOCUMENTS

| | | | |
|---|---|---|---|
| 5,663,734 A | 9/1997 | Krasner | |
| 5,663,735 A | 9/1997 | Eshenbach | |
| 5,781,156 A | 7/1998 | Krasner | |
| 5,812,087 A | 9/1998 | Krasner | |
| 5,825,327 A | 10/1998 | Krasner | |
| 5,831,574 A | 11/1998 | Krasner | |
| 5,841,396 A | 11/1998 | Krasner | |
| 5,874,914 A | 2/1999 | Krasner | |
| 5,884,214 A | 3/1999 | Krasner | |
| 5,945,944 A | 8/1999 | Krasner | |
| 5,999,124 A | 12/1999 | Sheynblat | |
| 6,002,363 A | 12/1999 | Krasner | |
| 6,016,119 A | 1/2000 | Krasner | |
| 6,052,081 A | 4/2000 | Krasner | |
| 6,061,018 A | 5/2000 | Sheynblat | |
| 6,064,336 A | 5/2000 | Krasner | |
| 6,104,338 A | 8/2000 | Krasner | |
| 6,104,340 A | 8/2000 | Krasner | |
| 6,104,815 A * | 8/2000 | Alcorn et al. ............. 380/251 |
| 6,107,960 A | 8/2000 | Krasner | |
| 6,111,540 A | 8/2000 | Krasner | |
| 6,131,067 A | 10/2000 | Girerd | |
| 6,133,871 A | 10/2000 | Krasner | |

(Continued)

OTHER PUBLICATIONS

Marketing Material: Qualcomm CDMA Technologies—Integrated Solutions—MGP6200™ Multimode GPS Processor (8 pages).

(Continued)

*Primary Examiner* — Patrick Edouard
*Assistant Examiner* — Ronald Eisner
(74) *Attorney, Agent, or Firm* — RatnerPrestia (57) ABSTRACT

A system and a method for integrating the receipt and transmission of location information into VoIP phone systems. The system may include a location device that includes a SATPS receiver and an antenna together with one or more connectors that allow connection of the location device to other devices, such as a VoIP telephone and a router, that are connected to and made a part of a VoIP phone system. A method of operating such a system is also disclosed.

13 Claims, 6 Drawing Sheets

U.S. PATENT DOCUMENTS

| | | | |
|---|---|---|---|
| 6,133,873 | A | 10/2000 | Krasner |
| 6,133,874 | A | 10/2000 | Krasner |
| 6,150,980 | A | 11/2000 | Krasner |
| 6,185,427 | B1 | 2/2001 | Krasner |
| 6,208,290 | B1 | 3/2001 | Krasner |
| 6,208,291 | B1 | 3/2001 | Krasner |
| 6,215,441 | B1 | 4/2001 | Moeglein |
| 6,215,442 | B1 | 4/2001 | Sheynblat |
| 6,236,354 | B1 | 5/2001 | Krasner |
| 6,239,742 | B1 | 5/2001 | Krasner |
| 6,259,399 | B1 | 7/2001 | Krasner |
| 6,272,430 | B1 | 8/2001 | Krasner |
| 6,289,041 | B1 | 9/2001 | Krasner |
| 6,307,504 | B1 | 10/2001 | Sheynblat |
| 6,313,786 | B1 | 11/2001 | Sheynblat |
| 6,314,308 | B1 | 11/2001 | Sheynblat |
| 6,377,209 | B1 | 4/2002 | Krasner |
| 6,408,196 | B2 | 6/2002 | Sheynblat |
| 6,411,254 | B1 | 6/2002 | Moeglein |
| 6,411,892 | B1 | 6/2002 | Van Diggelen |
| 6,417,801 | B1 | 7/2002 | Van Diggelen |
| 6,421,002 | B2 | 7/2002 | Krasner |
| 6,429,814 | B1 | 8/2002 | Van Diggelen et al. |
| 6,433,731 | B1 | 8/2002 | Sheynblat |
| 6,453,237 | B1 | 9/2002 | Fuchs et al. |
| 6,484,097 | B2 | 11/2002 | Fuchs et al. |
| 6,487,499 | B1 | 11/2002 | Fuchs et al. |
| 6,510,387 | B2 | 1/2003 | Fuchs et al. |
| 6,542,821 | B2 | 4/2003 | Krasner |
| 6,583,757 | B2 | 6/2003 | Krasner |
| 6,597,311 | B2 | 7/2003 | Sheynblat |
| 2004/0185870 | A1* | 9/2004 | Matsuda .................... 455/456.1 |
| 2006/0043164 | A1* | 3/2006 | Dowling et al. ............. 235/375 |
| 2006/0281437 | A1* | 12/2006 | Cook ......................... 455/404.2 |
| 2007/0115935 | A1* | 5/2007 | Qiu et al. ..................... 370/352 |
| 2007/0180485 | A1* | 8/2007 | Dua .............................. 725/114 |
| 2007/0232233 | A1* | 10/2007 | Liu et al. ..................... 455/41.2 |
| 2008/0132279 | A1* | 6/2008 | Blumenthal ................. 455/558 |

OTHER PUBLICATIONS

Marketing Material: uNav Microelectronics—uN9×18 Low Power, High Performance GPS Receiver Chipset/uN9×18 GPS Receiver Solution (9 pages).

Marketing Material: uNav Microelectronics, uN9×18 Low Power, High Performance GPS Receiver Chipset (2 pages).

Marketing Material: Global Locate—Hammerhead II™, Single Chip AGPS Solution (2 pages).

Marketing Material/Press Release: Broadcom Introduces Advanced Single-Chip GPS Solution for Mobile Applications (3 pages).

Marketing Material/White Paper: SnapTrack: A Qualcomm Company—Snap Track's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages).

* cited by examiner

SYSTEM AND METHOD FOR INTEGRATING LOCATION INFORMATION INTO AN INTERNET PHONE SYSTEM

BACKGROUND OF THE INVENTION

1. Field of Invention

The present invention relates generally to Voice over Internet Protocol ("VoIP") phone systems and in particular, to a system and a method for integrating location information into such VoIP phone systems.

2. Related Art

The growth of broadband Internet access has also given rise to an ever expanding use of VoIP technology as an alternative to traditional Plain Old Telephone Service ("POTS"). In general, VoIP or Internet telephony refers to communication services—voice, facsimile, and/or voice-messaging applications—that are transported over the Internet, rather than over the public switched telephone network ("PSTN"). The basic steps involved in originating an Internet telephone call are conversion of an analog voice signal to a digital format and then compression/translation of the digital signal into Internet protocol ("IP") packets for transmission over the Internet, with the process being reversed at the receiving end.

At the same time, the worldwide utilization of wireless devices such as two-way radios, pagers, portable televisions, personal communication systems ("PCSs"), personal digital assistants ("PDAs"), cellular telephones (also known as "mobile phones"), BLUETOOTH, satellite radio receivers and Satellite Positioning Systems ("SATPS") such as Global Positioning Systems ("GPS"), also known as NAVSTAR, is also growing at a rapid pace. As the number of people employing wireless devices increases, the number of features offered by wireless service providers also increases, as does the integration of these wireless devices into other products.

The number of features offered by wireless service providers is increasingly matching that offered by POTS providers. Features such as call waiting, call forwarding, caller identification ("caller ID"), three-way calling, data transmission and other features are commonly offered by both land-line and wireless service providers and these features generally operate in the same manner on both wireless devices and land-line telephones.

Another feature that is being introduced is to provide location information of a wireless device user in an emergency situation, commonly referred to as Enhanced 911 or E911 service. E911 is an example of an approach of providing a location of a person utilizing a cellular telephone in an emergency situation in a similar fashion to that of a 911 service call (normally referred to as a "911" call) on a land-line telephone. E911, however, operates differently on wireless devices than a 911 service call does on land-line telephones.

When a 911 call is placed from a land-line telephone, the 911 reception center receives the call and determines the origin of the call. In case the caller fails, or forgets, to identify his or her location, the 911 reception center is able to obtain the location from which the call was made from the land-line telephone switching network and send emergency personnel to the location of the call.

If instead, an E911 call is placed from a wireless device such as a cellular telephone, the E911 reception center receives the call but cannot determine the origin of the call. If the caller fails, or forgets, to identify his or her location, the E911 reception center is unable to obtain the location of the call because the mobile switching network is different than the land-line telephone switching network. At present, the best that the E911 reception center may possibly do is determine the location of the basestation corresponding to the cell from which the call was placed. Unfortunately, typical cells in a cellular network system may cover an area with approximately a 30-mile diameter.

However, the United States Congress, through the Federal Communications Commission ("FCC"), has enacted a requirement that cellular telephones be locatable to within 50 feet once an emergency call, such as an E911 call, is placed by a given cellular telephone. This type of position data would assist police, paramedics, and other law enforcement and public service personnel, as well as other agencies that may need to have legal rights to determine the position of specific cellular telephone.

Likewise, VoIP phone service providers need means to add location information to their systems, for the aforementioned E911 emergency response and other location-based applications. These VoIP phone systems currently have no automatic means to determine their location and relay that location through the network. Further, these VoIP phone systems may utilize small, portable digital phone adapters or routers that are often located in the basement of a home or in a closet or other enclosed space where receiving GPS signals may be difficult if not impossible. One solution is to have a VoIP user provide his physical address to the VoIP service provider prior to his dialing 911 in an emergency situation. This, however, results in additional problems in terms of the transportability of the VoIP equipment as well as the additional administrative and overhead expenses that the VoIP service provider will have to incur in operating and maintaining a basic 911 and E911 call center.

Therefore, there is a need for a system and a method capable of seamlessly integrating location information into VoIP phone systems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and a method for integrating the receipt and transmission of location information into VoIP phone systems, substantially as shown in and/or described in connection with at least one of the following figures, as set forth more completely in the claims, is disclosed.

An example of an embodiment is an in-line assisted position location engine that includes a SATPS receiver and an antenna that is connected between a digital phone adapter and a VoIP telephone utilizing RJ-11 jacks. In general, this embodiment may be in the form of a small, portable hardware device sometimes referred to as a "dongle."

Another example of such an embodiment is an in-line assisted position location engine that includes a SATPS receiver and an antenna that is connected between a router and a VoIP telephone utilizing Ethernet connectors. In yet another example, the dongle containing the position location engine may be connected to a laptop, personal computer ("PC"), or workstation computer having SoftPhone or WI-FI capability using a Universal Serial Bus ("USB") connector.

Additionally, a method of integrating location information into a VoIP phone system is disclosed. The method may include receiving Satellite Positioning System (SATPS) signals from a remote location, such as a satellite or pseudolite, determining the location of the VoIP telephone, and sending this location information over the Internet via the VoIP phone system whenever a 911 event occurs. The method may also include receiving location-aiding information from a basestation or other remote location to aid in the determination of the location of the VoIP telephone.

Various advantages, aspects and novel features of the present invention, as well as details of an illustrated embodiment thereof, will be more fully understood from the following description and drawings.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of various alternative implementations, reference is made to the accompanying drawings that form a part hereof, and in which is shown by way of illustration one or more specific implementations in which the invention may be practiced. It is to be understood that other implementations may be utilized and structural changes may be made without departing from the spirit and scope of this invention.

Figure 1:
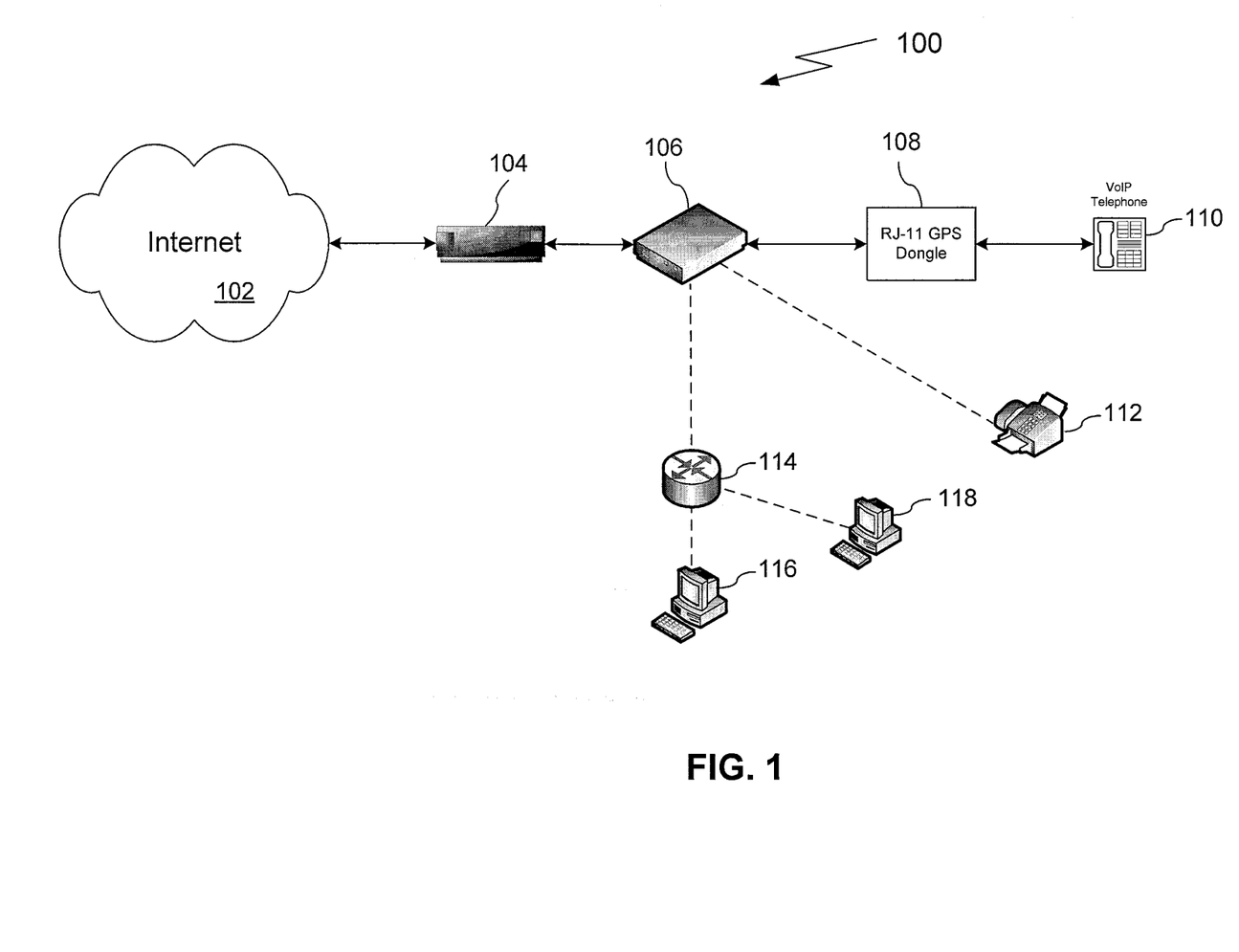
FIG. 1 shows a block diagram illustrating the basic network elements of an example implementation of a VoIP phone system that includes an RJ-11 GPS dongle in accordance with an embodiment of the invention.

A system and a method for integrating location information into a VoIP telephone system are disclosed. In general, the system may include a location device that includes a SATPS receiver and an antenna together with connectors that allow connection of the location device to other devices that are connected to and made a part of a VoIP phone system. As an example implementation, FIG. 1 shows a block diagram illustrating the basic network elements of such a system. In FIG. 1, a cable or Digital Subscriber Line ("DSL") modem ("cable/DSL modem") 104 connects a user of the system 100 to the Internet 102, and from the cable/DSL modem 104, data received from the Internet 102 is sent to a digital phone adapter 106, such as, for example, a Linksys RTP 300. Digital phone adapter 106 may have both RJ-11 and Ethernet connections, and in this example implementation, one end of RJ-11 GPS dongle 108 is connected to digital phone adapter 106 by means of an RJ-11 jack, and the other end is connected to VoIP telephone 110, also by means of an RJ-11 jack.

FIG. 1 also shows a fax machine 112 connected to digital phone adapter 106 by means of an RJ-11 connection, and also router 114 connected to digital phone adapter 106 by an Ethernet connection, with workstations 116 and 118 in turn connected to router 114 by Ethernet connections. FIG. 1 shows these additional network devices for illustrative purposes and these devices are not part of the claimed invention. It is appreciated by those of ordinary skill in the art that these additional network devices may be PCs, workstations, servers, peripherals, PDAs, gaming desktops, Internet-enabled cell phones, and any other devices capable of being connected to or communicating with a network through a digital phone adapter, a router, or other similar device to which a device such as RJ-11 GPS dongle 108 may also be connected, and that the number of network devices in signal communication with the digital phone adapter, router, or other similar device is limited only by their respective capacities and scalability.

Figure 2:
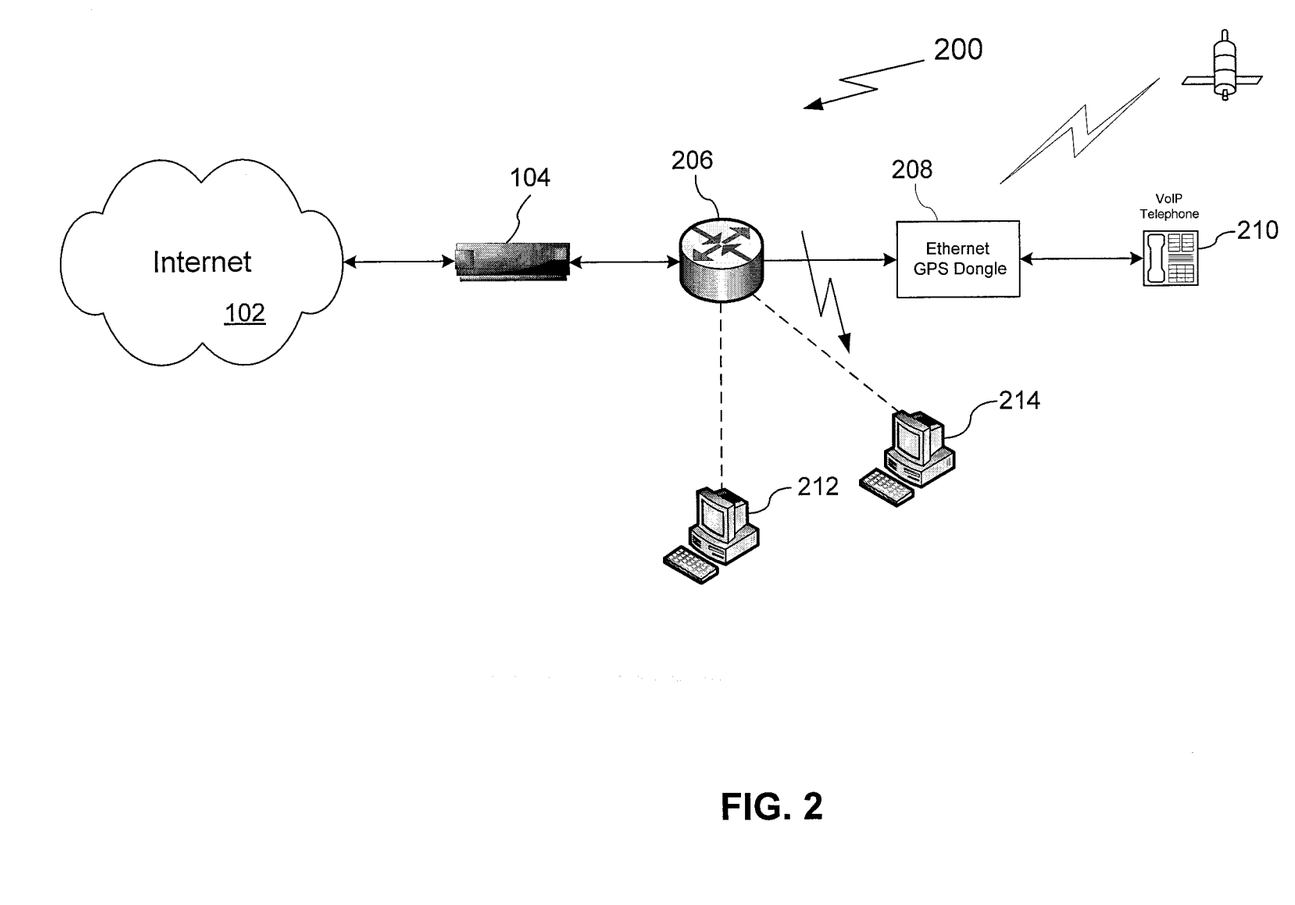
FIG. 2 shows a block diagram illustrating the basic network elements of another example implementation of a VoIP phone system that includes an Ethernet GPS dongle in accordance with an embodiment of the invention.

FIG. 2 shows a block diagram illustrating the basic network elements of another example implementation of a VoIP phone system that includes an Ethernet GPS dongle in accordance with an embodiment of the invention. As in FIG. 1, a cable/DSL modem 104 connects a user of the system 200 to the Internet 102, and from the cable/DSL modem 104, data received from the Internet 102 is sent to a router 206 that is connected to cable/DSL modem 104 by means of an Ethernet connection. In this example implementation, one end of Ethernet GPS dongle 208 is connected to router 206 by means of an Ethernet connection, and the other end is connected to VoIP telephone 210 by means of another Ethernet connection.

Also as in FIG. 1, FIG. 2 shows additional network devices for illustrative purposes and these devices are not part of the claimed invention. Specifically, these network devices, workstations 212 and 214, are connected to router 206 by means of additional Ethernet connections.

Figure 3:
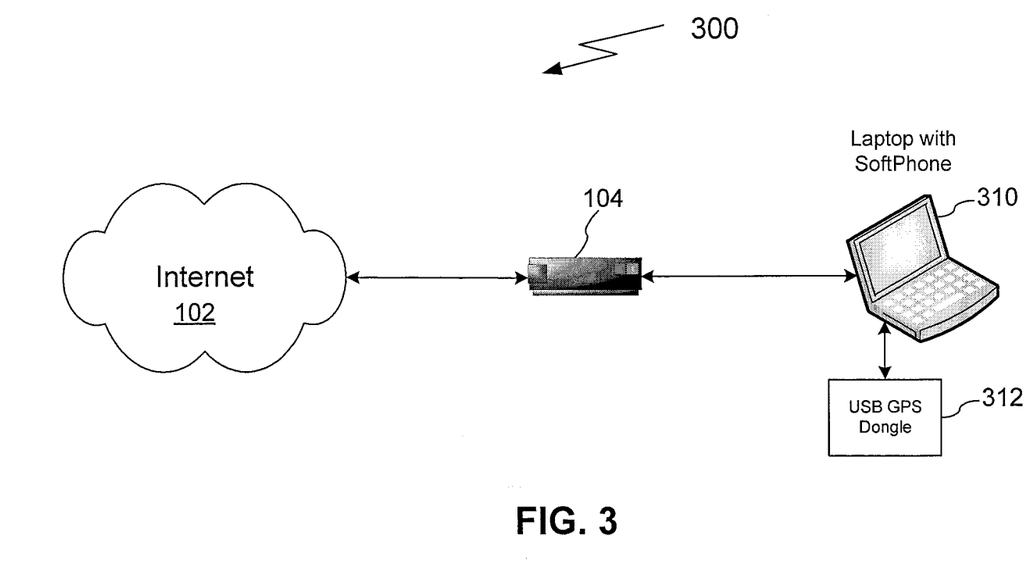
FIG. 3 shows another block diagram illustrating the basic network elements of yet another example implementation of a VoIP phone system that includes a laptop computer that may have either SoftPhone or WI-FI capability together with a USB GPS dongle in accordance with an embodiment of the invention.

Turning to FIG. 3, another block diagram illustrating the basic network elements of yet another example implementation of a VoIP phone system is shown, in this case, one that includes a Universal Serial Bus ("USB") GPS dongle in accordance with an embodiment of the invention. As in FIG. 1, a cable/DSL modem 104 connects a user of the system 300 to the Internet 102, and from the cable/DSL modem 104, data received from the Internet 102 is sent to directly to laptop 310 having a so-called "softphone," i.e., software that may be downloaded into a laptop, personal computer ("PC"), or workstation computer that may, for example, have an interface that includes a telephone keypad displayed on a monitor. Rather than an VoIP telephone, the user may speak into and listen over a computer headset with a microphone (not shown). Attached to laptop 310 by means of a USB connection is USB GPS dongle 312.

Unlike the dongles 108 and 208 in FIGS. 1 and 2, respectively, USB GPS dongle 312 has only a single USB connection. Also, it is appreciated by those skilled in the art that in another implementation, in lieu of an external dongle connected to the laptop, the components contained in the external dongle may be installed in the laptop together with the softphone. Likewise, it is also appreciated that in the case of the example implementations shown in FIGS. 1 and 2 that utilize a VoIP telephone, one or more of these components may be installed in the VoIP itself, while others may be installed in other devices included within the system, such as, for example, workstations 212 and 214 shown in FIG. 2. Additionally, USB GPS dongle 312 may also receive its power directly from laptop 310, while dongles 108 and 208 may require a separate AC power sources (not shown).

Figure 4:
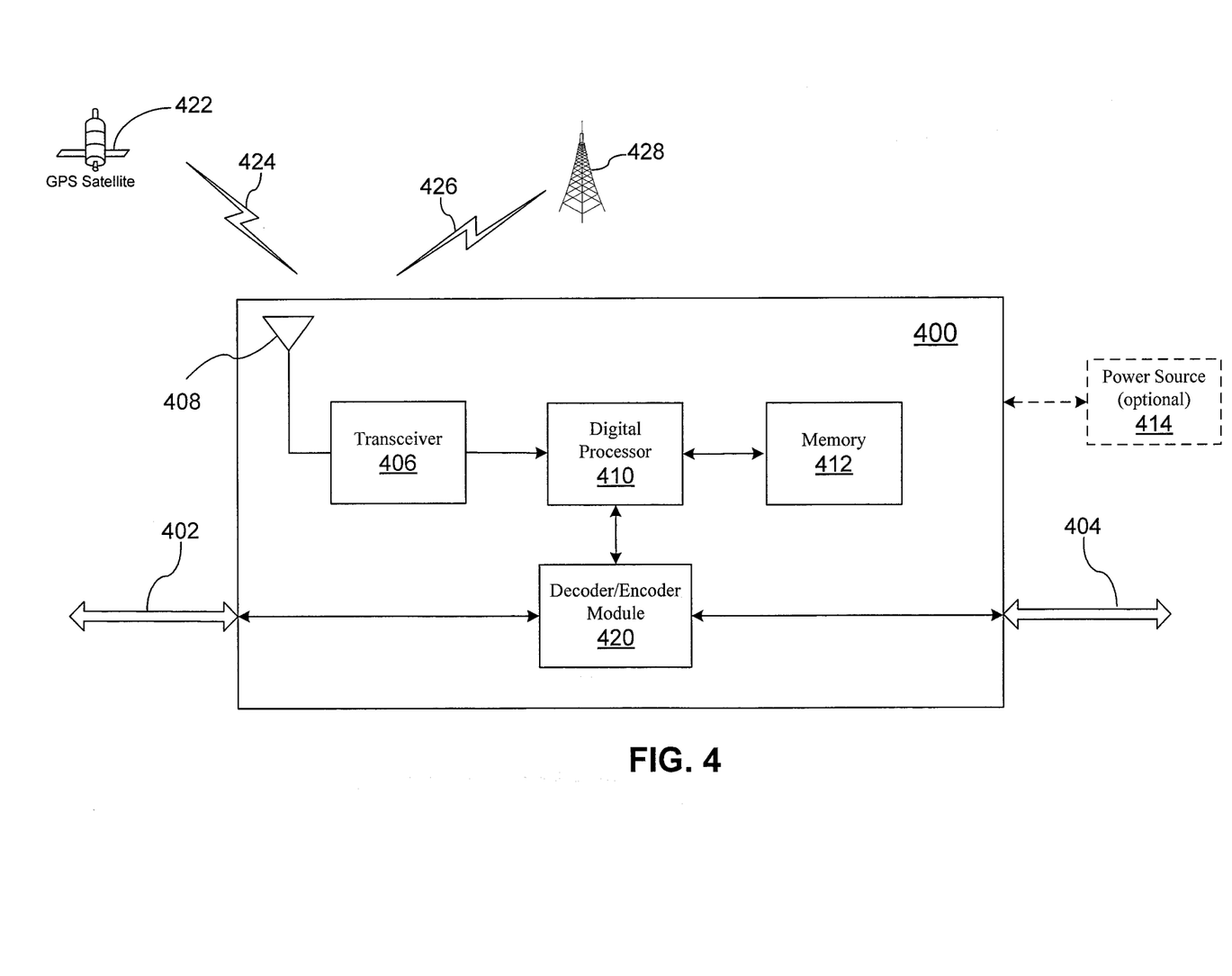
FIG. 4 shows a block diagram illustrating an example implementation of an apparatus configured to integrate location information into a VoIP phone system.

A block diagram illustrating an example implementation of the dongles shown in FIGS. 1 and 2 is shown in FIG. 4. In general, dongle 400 is a device that receives and integrates location information into a VoIP phone system. Dongle 400 may include a transceiver 406 and an antenna 408 configured to receive location information from a remote location, such as a GPS satellite 422, via wireless communication link 424. The received location information is processed by digital processor 410 to determine the location of a VoIP telephone in signal communication with the dongle 400 (not shown) and the location information is then stored in memory 412.

Communication path 404 connects dongle 400 with the VoIP telephone (not shown) and may include a connector such as the RJ-11 jack, the Ethernet RJ-45 jack, or the USB jack as shown in FIGS. 1, 2, and 3, respectively, dependent on the configuration selected by the user. As an example of operation, when a user makes an E911 call using his VoIP telephone, the VoIP packets comprising the VoIP telephone messages are transmitted over communication path 404 to the decoder/encoder module 420. If the incoming VoIP packets are determined to require location information for the VoIP telephone, the decoder/encoder module 420 will then communicate with the digital processor 410 to retrieve the location information from memory 412 and combine it with the incoming VoIP packets into an output data stream.

The output data stream, which includes the VoIP packets and the location information, is then sent back to the Internet via communication path 402, which connects dongle 400 with a digital phone adapter or a router (not shown) and may include a connector such as the RJ-11 jack or the Ethernet RJ-45 jack, as shown in FIGS. 1 and 2, respectively, dependent on the configuration selected by the user. The digital phone adapter or router, as the case may be, is in turn connected to a cable/DSL modem (not shown), which provides the connection to the Internet (not shown).

The digital processor 410 may also be configured to process non-SATPS aiding signals received from a remote location, such as basestation 428, via wireless communication link 426. In general, the VoIP telephone may be implemented in conjunction with a WI-FI enabled device, laptop computer, desktop computer, or other similar devices and thus may operate in multiple modes of operation. Thus the dongle 400 may be configured to operate in various environments and to receive and/or send "aiding" information from or to an external network or external aiding devices such that it is capable of triangulating its own location by measuring the received signals. Examples of such modes are GPS-standalone mode, GPS-autonomous mode, GPS-network-aided mode, GPS-network-centric mode, reverse-aiding mode, network-based mode, and augmented-aiding mode. Additionally, dongle 400 may also include an optional power source 414.

Figure 5:
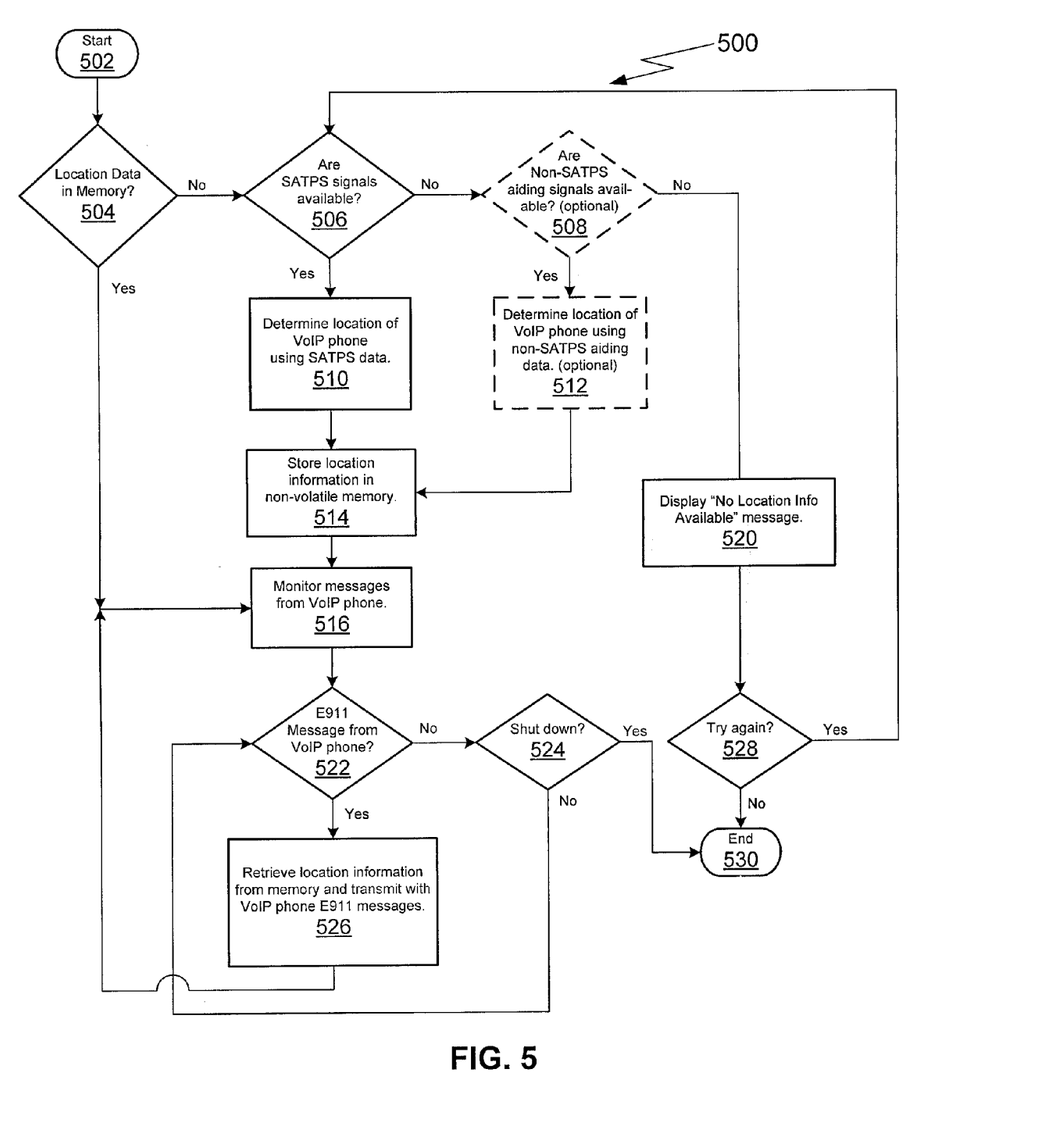
FIG. 5 shows a flowchart illustrating an example of a method of integrating location information into a VoIP phone system where the system is operating in a standard mode.

In FIG. 5, a flowchart illustrating an example of a method of integrating location information into a VoIP phone system is shown. The example process 500 starts in step 502 where the system is powered on. In decision step 504, a check is made to see if the location information for the VoIP telephone of the system is found in the system's memory. If the location information is found in memory, the process proceeds to step 516, where the system is monitored for outgoing E911 calls. Otherwise, in decision step 506, a determination is made as to whether SATPS signals are available for determining the location of the VoIP telephone.

If the SATPS signals are available, the location of the VoIP telephone is determined in step 510. In step 514, this location information is stored in non-volatile memory of the system, and process 500 then proceeds to step 516 where the system is monitored for outgoing E911 calls. If the SATPS signals are not available, the process 500 then determines in decision step 508 (optional) whether non-SATPS aiding signals are available for determining the location of the VoIP telephone. If such aiding signals are available, the process proceeds to step 512 (optional) where the location of the VoIP telephone is determined using the non-SATPS aiding signals and once determined, this location information is stored in non-volatile memory of the system in step 514.

If non-SATPS aiding signals are not available, the user is advised in step 520 that the location of the VoIP telephone cannot be found or determined, and the user is then given the options in decision step 528 of trying again to determine the location of the VoIP telephone, in which case the process 500 returns to decision step 506, or of ending the process in step 530.

Turning to decision step 522, the process 500 repeatedly monitors the system for outgoing E911 messages. If it is determined that there is an outgoing E911 message from the VoIP telephone in decision step 522, then in step 526 the location information of the VoIP telephone is retrieved from memory and placed in an outgoing data stream together with the VoIP packets for transmission over the Internet.

Decision step 524 gives the user the opportunity to power down the system. If the user wishes to continue operating the system, the process 500 returns to decision step 522, where the VoIP telephone is continuously monitored for outgoing E911 messages.

Figure 6:
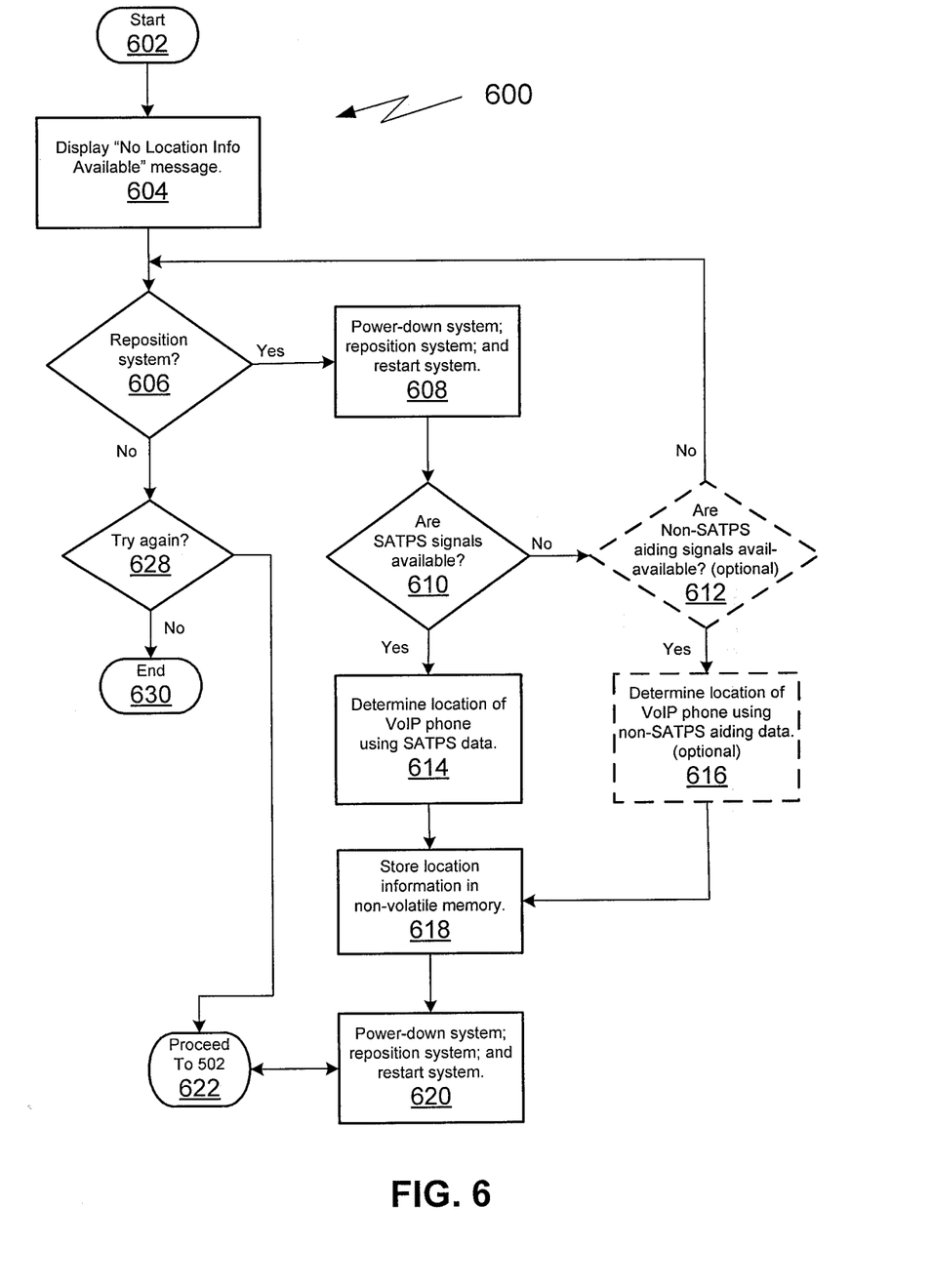
FIG. 6 shows a flowchart illustrating another example of a method of integrating location information into a VoIP phone system where the system is operating in a survey mode.

Turning to FIG. 6, a flowchart illustrating another example of a method of integrating location information into a VoIP phone system is shown. In FIG. 6, the system 600 is operating in a survey mode, which is a mode intended for situations of low SATPS signal strength. In general, the survey mode may inform a user that a location cannot be determined, thus allowing the user to power down the system and physically relocate the system where the signal strength is significantly improved, e.g., near a window. The user may then power up the system and receive SATPS signals with the required strength, determine a new location of the VoIP telephone, store this location information in memory, and then power down the system and relocate it to its original desired position.

The example process 600 starts in step 602 and in step 604, the user is advised that the system cannot determine the location of the user. In the survey mode, the system may utilize a high-sensitivity assisted chip integrated into any of the location devices shown in FIGS. 1-3. In addition to the display shown in step 604, the system may also utilize one or more flashing red lights that indicate to the user that the system cannot find sufficiently strong SATPS signals to determine a location, as well as one or more flashing green lights that indicate a location for the VoIP telephone has been determined.

If a location for the VoIP telephone cannot be determined, the user is given the opportunity to reposition the system in decision step 606. If the user chooses to do so, the process proceeds to step 608 where the system is powered down, repositioned in a new location, and then restarted. As an example, if the SATPS signals are very week because the SATPS receiver is located in a basement of a residence or in a telecom closet, the SATPS receiver can be moved to a more open area, e.g., a higher floor in a multi-story builder or near a window. If the user elects not to reposition the system, the user is then given the choice in decision step 628 to return to step 502 of FIG. 5, i.e., the standard mode of operation, or to proceed to step 630 where the process 600 is ended.

As in decision step 506 of FIG. 5, in decision step 610, a determination is made as to whether SATPS signals are now available for determining the location of the VoIP telephone. If the SATPS signals are available, the location of the VoIP telephone is determined in step 614, and in step 618, this location information is stored in non-volatile memory of the system, and process 600 then proceeds to step 620. In step 620, the system is powered down, returned to its desired location, and then restarted. Once restarted, the process proceeds to step 502 of FIG. 5 to resume the standard mode of operation.

If the SATPS signals are not available, the process 600 then determines in decision step 612 (optional) whether non-SATPS aiding signals are available for determining the location of the VoIP telephone. If such aiding signals are available, the process proceeds to step 616 (optional) where the location of the VoIP telephone is determined using the non-SATPS aiding signals and once determined, this location information is stored in non-volatile memory of the system in step 618 and the process proceeds to step 620 where the system is powered down, returned to its desired location, and then restarted. Once restarted, the process proceeds to step 502 of FIG. 5 to resume the standard mode of operation.

If non-SATPS aiding signals are not available, i.e., the location of the VoIP telephone cannot be found or determined, the process 600 then returns to decision step 606, where the user is given the opportunity to repeat steps 608 through 620, that is, to relocate the system once more. If the user elects not to do so, the user is given, in decision step 628, the choice of either returning to the standard mode by proceeding to step 502 of FIG. 5 or of ending the process in step 630.

Persons skilled in the art will understand and appreciate that one or more processes, sub-processes, or process steps described above may be performed by hardware and/or software. Additionally, the system may be implemented completely in software that would be executed within a microprocessor, a general purpose processor, a combination of processors, a digital signal processor ("DSP"), and/or one or more ASICs. If the process is performed by software, the software may reside in software memory in the controller. The software in software memory may include an ordered listing of executable instructions for implementing logical functions (i.e., "logic" that may be implemented either in digital form such as digital circuitry or source code or in analog form such as analog circuitry or an analog source such as an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While various preferred and alternative embodiments of the present intention are described herein, it will be apparent to one of ordinary skill in the art after reading this description that there are various modifications and extensions of the above described technology that may be implemented using these teachings without departing from the spirit and scope of the present invention, the breadth and scope of which shall be defined by following claims.

What is claimed is:

1. A location device for receiving Satellite Positioning System (SATPS) signals for use in a Voice over Internet Protocol ("VoIP") phone system, the location device comprising:
   a receiver receiving the SATPS signals;
   a first connector integrally connecting the location device to a communication device, wherein said first connector includes a Universal Serial Bus ("USB") connecting the location device to said communication device; and
   a digital processor inside the location device, determining the location of the location device based on the SATPS signals, and inserting the determined location into a VoIP data stream received from the communication device; and
   wherein the communication device is configured to receive the VoIP data stream including the determined location from the location device and transmit the VoIP data stream including the determined location over the VoIP phone system.

2. The location device of claim 1, further including a memory in signal communication with the digital processor.

3. The location device of claim 2, wherein the communication device is a software telephone installed on a mobile computer.

4. The location device of claim 3, wherein the mobile computer is a laptop, notebook, sub-notebook, or personal digital assistant ("PDA").

5. The location device of claim 4, wherein the receiver, the digital processor, and the memory are installed on the mobile computer and the first connector is a data bus between the location device and the mobile computer.

6. The location device of claim 4, wherein the receiver, the digital processor, and the memory are enclosed in an external dongle and the first connector includes a Universal Serial Bus ("USB") connecting the external dongle with the mobile computer.

7. The location device of claim 2, further including a second connector connecting the communications device to a network.

8. The location device of claim 2, wherein the communication device is a VoIP telephone.

9. The location device of claim 8, wherein the receiver, the digital processor, and the memory are enclosed in an external dongle adaptable for connection to the VoIP telephone by the first connector.

10. The location device of claim 7, wherein the first connector includes an RJ-11 jack configured to connect the location device to the VoIP telephone, and the second connector includes an RJ-11 jack configured to connect the location device to a digital phone adapter in signal communication with a network.

11. The device of claim 7, wherein the first connector includes an ETHERNET RJ-4S jack configured to connect the location device to the VoIP telephone; and the second connector includes an ETHERNET RJ-45 jack configured to connect the location device to a router in signal communication with a network.

12. The device of claim 9, wherein the receiver is also configured to receive location aiding signals from a second remote location via a second wireless communications link.

13. The device of claim 9, further including an output data stream comprising messages from the VoIP telephone and location data generated by the location device.

* * * * *

UNITED STATES PATENT AND TRADEMARK OFFICE
CERTIFICATE OF CORRECTION

PATENT NO.       : 8,478,305 B2                                    Page 1 of 1
APPLICATION NO.  : 12/100331
DATED            : July 2, 2013
INVENTOR(S)      : McCarthy et al.

It is certified that error appears in the above-identified patent and that said Letters Patent is hereby corrected as shown below:

In the Drawings:

In Fig. 6, Sheet 6 of 6, in Box "612", Lines 3-4, delete "avail-available?" and insert -- available? --, therefor.

In the Specifications:

In Column 4, Line 49, delete "an VoIP" and insert -- a VoIP --, therefor.

In the Claims:

In Column 8, Line 19, in Claim 1, delete "("VoIP")" and insert -- ("VoIP") --, therefor.

In Column 9, Line 2, in Claim 11, delete "RJ-4S" and insert -- RJ-45 --, therefor.

Signed and Sealed this
Third Day of December, 2013

Margaret A. Focarino
*Commissioner for Patents of the United States Patent and Trademark Office*